Oct. 12, 1937.    J. P. BOURDIC    2,095,689

SPRING HOLDER AND SUPPORT

Filed Feb. 27, 1936

INVENTOR.
BY Jack P. Bourdic
Daniel G. Cullen
ATTORNEY.

Patented Oct. 12, 1937

2,095,689

UNITED STATES PATENT OFFICE 2,095,689

SPRING HOLDER AND SUPPORT

Jack P. Bourdic, St. Clair Shores, Mich., assignor of one-half to Leopold E. Zink, Detroit, Mich.

Application February 27, 1936, Serial No. 66,139

3 Claims. (Cl. 267—62)

This application relates to spring holders and supports and particularly to such designed for use with coned coiled volute springs.

For an understanding of the holders and supports herein disclosed reference should be had to the appended drawing in which—

Figures 1, 2:
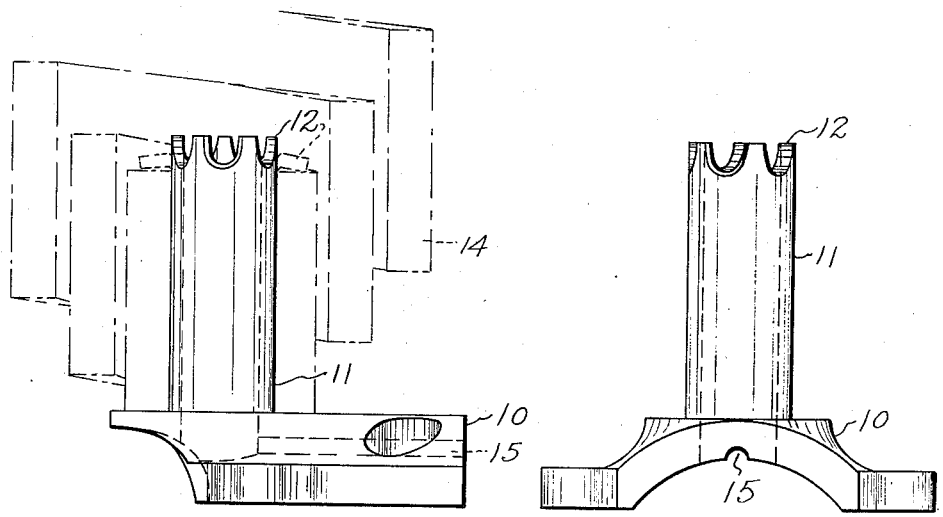
Figure 3:
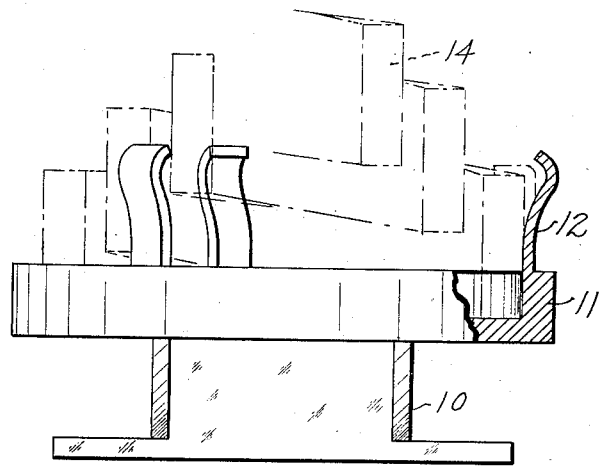

Figs. 1 and 2 show in front and side elevation one form of holder and support, and Fig. 3 shows another form of holder and support.

Each holder and support shown comprises a base 10, and a tube 11 projecting therefrom and provided with lugs 12 bendable over a turn of the coned coiled volute spring 14 associated with the holder and support. Where the anchored turn is the small one, the tube is disposed within the turn and its lugs are bent out and over (Figs. 1-2), whereas, where the anchored turn is the large one, the tube is disposed around the turn and its lugs are bent in and over (Fig. 3).

The tube of Fig. 1 is hollow to drain the interior of the spring and its base is provided with a drain groove 15 which assures drainage even when the base is disposed on a member of the curvature of the under surface of the base.

The tube of Fig. 1 is shown unthreaded, but, if desired, might be threaded to cooperate with the threads on the interior of the small turn of the spring, for more effectively securing the spring to the holder.

The holder of Fig. 3 may be inverted and utilized as a cap or cover for the large end of a spring mounted on the holder of Fig. 1, if desired, with prongs 12 interlocking the cap and spring to each other.

I claim:

1. In combination, an automobile part, a volute spring, and means secured to the automobile part and forming a holder and support and anchorage for one end only of the spring with the other end unanchored and comprising a heavy rigid base fixed to the part and a tube integral therewith and projecting therefrom, the tube having lugs bendable over a turn of the spring to hold that turn of the spring and tube in relatively telescoped relation, the interior of the spring communicating with the ambient atmosphere through the tube.

2. In combination, an automobile part, a volute spring, and means secured to the automobile part and forming a holder and support and anchorage for one end only of the spring with the other end unanchored and comprising a heavy rigid base fixed to the part and a tube integral therewith and projecting therefrom, the tube being of small diameter to be received within the small turn of the coiled spring and having lugs bendable out and over that turn of the spring to hold that turn of the spring on the base and around the tube, the tube draining the interior of the spring.

3. In combination, an automobile part, a volute spring, and means secured to the automobile part and forming a holder and support and anchorage for one end only of the spring with the other end unanchored and comprising a heavy rigid base fixed to the part and a tube integral therewith and projecting therefrom, the tube being of small diameter to be received within the small turn of the coiled spring and having lugs bendable out and over that turn of the spring to hold that turn of the spring on the base and around the tube, the tube draining the interior of the spring, the base having a groove on the surface thereof opposite that from which the tube projects, and communicating with the interior of the tube.

JACK P. BOURDIC.